US011238494B1

(12) United States Patent
Burcham et al.

(10) Patent No.: US 11,238,494 B1
(45) Date of Patent: Feb. 1, 2022

(54) ADAPTING CONTENT PRESENTATION BASED ON MOBILE VIEWSHEDS

(71) Applicant: T-Mobile Innovations LLC, Overland Park, KS (US)

(72) Inventors: Robert H. Burcham, Overland Park, KS (US); Matthew Habiger, Kansas City, KS (US)

(73) Assignee: Sprint Communications Company L.P., Overland Park, KS (US)

(*) Notice: Subject to any disclaimer, the term of this patent is extended or adjusted under 35 U.S.C. 154(b) by 467 days.

(21) Appl. No.: 15/838,016

(22) Filed: Dec. 11, 2017

(51) Int. Cl.
G06Q 30/00 (2012.01)
G06Q 30/02 (2012.01)
(52) U.S. Cl.
CPC ..... *G06Q 30/0254* (2013.01); *G06Q 30/0265* (2013.01); *G06Q 30/0275* (2013.01)
(58) Field of Classification Search
CPC ........... G06Q 30/0254; G06Q 30/0265; G06Q 30/0275
See application file for complete search history.

(56) References Cited

U.S. PATENT DOCUMENTS

| 6,486,861 | B1* | 11/2002 | Preas ................. G09G 3/04 345/107 |
| 7,221,287 | B2* | 5/2007 | Gueziec .............. H04W 4/029 340/905 |
| 8,391,836 | B1 | 3/2013 | Bolot et al. |
| 8,589,318 | B2 | 11/2013 | Sundararajan et al. |
| 9,122,693 | B2 | 9/2015 | Blom et al. |
| 9,171,461 | B1* | 10/2015 | Dabell ................... G08G 1/012 |
| 9,326,096 | B1 | 4/2016 | Gatmir-Motahari et al. |
| 9,408,037 | B1* | 8/2016 | Alizadeh-Shabdiz ....... H04W 4/029 |
| 9,710,873 | B1 | 7/2017 | Hill |
| 10,300,846 | B2* | 5/2019 | Suzuki ................. B60Q 1/50 |
| 10,332,151 | B2 | 6/2019 | Megdal |
| 10,459,964 | B2* | 10/2019 | Mei ................... G06F 16/90324 |

(Continued)

FOREIGN PATENT DOCUMENTS

| GB | 2516513 A | 1/2015 |
| WO | WO-03051478 A1 * | 6/2003 ............. A63F 13/57 |

OTHER PUBLICATIONS

Alt; Advertising on Public Display Networks; IEEE Computer Societ 2012; pp. 50-56; 2012.*

(Continued)

*Primary Examiner* — Radu Andrei

(57) ABSTRACT

A method of managing use of a digital billboard. The method comprises determining, by an analysis application executing on a computer system, a plurality of mobile viewsheds for each of a plurality of mobile communication devices, where a mobile viewshed comprises a location, a speed, a direction of travel of the mobile communication device, accessing demographic and profile information of a subscriber associated with the device, determining an arcscore for each of the mobile viewsheds that intersect a static viewshed of the digital billboard based in part on the speed of the mobile viewshed and the angular alignment of the direction of travel of the mobile viewshed with an orientation of the static viewshed of the digital billboard, and rotating content presentation on the digital billboard at a rate determined in part based on the arcscores and based on the average traffic speed.

20 Claims, 9 Drawing Sheets

(56) References Cited

U.S. PATENT DOCUMENTS

| | | | |
|---|---|---|---|
| 10,469,981 B1 | 11/2019 | Dannamaneni et al. | |
| 10,555,130 B1 | 2/2020 | Burcham et al. | |
| 10,645,531 B1 | 5/2020 | Burcham et al. | |
| 10,657,806 B1 | 5/2020 | Burcham et al. | |
| 10,694,321 B1 | 6/2020 | Burcham et al. | |
| 10,715,950 B1 | 7/2020 | Burcham et al. | |
| 10,715,964 B1 | 7/2020 | Burcham et al. | |
| 10,911,888 B1 | 2/2021 | Burcham et al. | |
| 11,067,411 B1 | 7/2021 | Burcham et al. | |
| 2002/0055900 A1* | 5/2002 | Kansal | G06Q 40/08 705/37 |
| 2002/0188550 A1* | 12/2002 | Swartz | G06Q 30/02 705/37 |
| 2003/0023698 A1* | 1/2003 | Dieberger | H04L 67/36 709/207 |
| 2004/0254698 A1 | 12/2004 | Hubbard et al. | |
| 2006/0100956 A1* | 5/2006 | Ryan | G06F 16/30 705/37 |
| 2006/0229939 A1* | 10/2006 | Bhakta | G06Q 99/00 705/14.62 |
| 2007/0191029 A1 | 8/2007 | Zarem et al. | |
| 2008/0201305 A1* | 8/2008 | Fitzpatrick | G06Q 30/02 |
| 2008/0248815 A1* | 10/2008 | Busch | G06Q 30/0261 455/456.5 |
| 2009/0150217 A1 | 6/2009 | Luff | |
| 2009/0210287 A1* | 8/2009 | Chickering | G06Q 30/0267 705/14.71 |
| 2009/0319177 A1 | 12/2009 | Khosravy et al. | |
| 2010/0094867 A1* | 4/2010 | Badros | G06Q 30/0277 707/725 |
| 2010/0279708 A1 | 11/2010 | Lidsrom et al. | |
| 2011/0090080 A1 | 4/2011 | Yu | |
| 2012/0005532 A1* | 1/2012 | Li | G06F 11/0709 714/26 |
| 2012/0008526 A1 | 1/2012 | Borghei | |
| 2012/0013806 A1* | 1/2012 | Hsieh | G09G 5/00 348/581 |
| 2012/0040637 A1 | 2/2012 | Wigren | |
| 2012/0078733 A1* | 3/2012 | Visinoni | G06Q 30/02 705/14.73 |
| 2012/0163206 A1 | 6/2012 | Leung et al. | |
| 2013/0262479 A1 | 10/2013 | Liang et al. | |
| 2013/0267255 A1 | 10/2013 | Liu et al. | |
| 2014/0122220 A1* | 5/2014 | Bradley | G06Q 30/0267 705/14.42 |
| 2014/0258201 A1 | 9/2014 | Finlow-Bates | |
| 2014/0279026 A1* | 9/2014 | Nath | G06Q 30/0267 705/14.64 |
| 2015/0029176 A1 | 1/2015 | Baxter et al. | |
| 2015/0051829 A1 | 2/2015 | Gearhart et al. | |
| 2015/0051957 A1* | 2/2015 | Griebeler | G06Q 10/06395 705/7.41 |
| 2015/0081617 A1 | 3/2015 | Shaik et al. | |
| 2015/0088423 A1 | 3/2015 | Tuukkanen | |
| 2015/0106011 A1 | 4/2015 | Nesbitt | |
| 2015/0146917 A1* | 5/2015 | Bernal | G06K 9/00771 382/103 |
| 2015/0149285 A1 | 5/2015 | Schroeter | |
| 2015/0201298 A1* | 7/2015 | Zhang | H04W 4/02 455/456.1 |
| 2015/0204680 A1 | 7/2015 | Lee et al. | |
| 2015/0278868 A1* | 10/2015 | O'Connor | G06Q 30/0263 705/14.41 |
| 2015/0310502 A1* | 10/2015 | Tang | G06Q 30/0275 705/14.71 |
| 2015/0382139 A1 | 12/2015 | Omar | |
| 2016/0076908 A1 | 3/2016 | Pang et al. | |
| 2016/0180392 A1* | 6/2016 | Liu | G06Q 30/0267 705/14.53 |
| 2016/0330589 A1 | 11/2016 | Tuukkanen | |
| 2016/0367899 A1* | 12/2016 | Boncyk | G06K 9/4652 |
| 2017/0068001 A1* | 3/2017 | Chhokra | G01S 19/428 |
| 2017/0124472 A1* | 5/2017 | Fu | G06Q 30/02 |
| 2017/0153113 A1 | 6/2017 | Gotoh et al. | |
| 2017/0185806 A1* | 6/2017 | Kong | G06F 21/45 |
| 2017/0187788 A1 | 6/2017 | Botea et al. | |
| 2017/0213240 A1* | 7/2017 | Waldron | G06Q 30/0246 |
| 2017/0223497 A1* | 8/2017 | Wang | H04W 4/023 |
| 2017/0277716 A1 | 9/2017 | Giurgiu et al. | |
| 2017/0301220 A1* | 10/2017 | Jarrell | H04W 4/38 |
| 2018/0014161 A1 | 1/2018 | Warren et al. | |
| 2018/0059669 A1* | 3/2018 | Madigan | G08G 1/04 |
| 2018/0114251 A1* | 4/2018 | Zavesky | G06Q 30/0265 |
| 2018/0197204 A1* | 7/2018 | Wan | G06F 3/04842 |
| 2018/0240026 A1 | 8/2018 | Pietrobon et al. | |
| 2018/0259356 A1 | 9/2018 | Rolf et al. | |
| 2018/0266829 A1 | 9/2018 | Frtiz et al. | |
| 2018/0283896 A1 | 10/2018 | Piemonte et al. | |
| 2018/0330403 A1* | 11/2018 | Olivieri | G06Q 30/0273 |
| 2019/0108548 A1* | 4/2019 | Gaither | G06Q 30/0261 |
| 2019/0220898 A1* | 7/2019 | Rhodes | G06Q 30/0266 |
| 2019/0347679 A1 | 11/2019 | Banerjee et al. | |
| 2020/0184609 A1* | 6/2020 | Meagher | G06T 5/005 |

OTHER PUBLICATIONS

Froelich; Visual Presentation Challenges for Mobile Spatial Applications; IEEE 2008; pp. 533-538; 2008.*

Santos; Using pervasive computing technologies for public ads in public places; Politechnical Institute de Castelo Branco Portugal; 3 pages; 2008.*

Burcham, Robert H., et al., "System and Method of Mobile Phone Location in a Subway Transit Environment," filed Apr. 9, 2019, U.S. Appl. No. 16/379,781.

Dannamaneni, Prashanth, et al., "Mobile Phone Mobile Viewshed Analysis," filed Apr. 3, 2018, U.S. Appl. No. 15/944,512.

FAIPP Pre-Interview Communication dated May 28, 2019, U.S. Appl. No. 15/944,512, filed Apr. 3, 2018.

Notice of Allowance dated Jul. 10, 2019, U.S. Appl. No. 15/944,512, filed Apr. 3, 2018.

FAIPP Pre-Interview Communication dated Aug. 28, 2019, U.S. Appl. No. 16/398,258, filed Apr. 29, 2019.

Bobe, Brooke M., et al., "Mobile Communication Device Locations Data Analysis Supporting Build-Out Decisions", filed Apr. 9, 2019, U.S. Appl. No. 16/379,774.

Burcham, Robert, H., et al., "Route Building Engine Tuning Framework", filed Apr. 29, 2019, U.S. Appl. No. 16/398,254.

Burcham, Robert H., et al. "Point of Interest (POI) Definition Tuning Framework" filed Apr. 29, 2019, U.S. Appl. No. 16/398,258.

Burcham, Robert H., et al., "System and Method of Mobile Phone Location in a Subway Transit Environment," filed Apr. 9, 2019, U.S. Appl. No. 16/379,791.

Burcham, Robert H., et al., "Pre-processing of Mobile Communications Device Geolocations According to Travel Mode in Traffice Analysis," filed Apr. 9, 2019, U.S. Appl. No. 16/379,784.

Burcham, Robert H., et al., "Transformation of Point of Interest Geometries to Lists of Route Segments in Mobile Communication Device Traffic Analysis," filed Apr. 9, 2019, U.S. Appl. No. 16/379,786.

Burcham, Robert H., et al., "Pattern Matching in Point-of-Interest (POI) Traffic Analysis," filed Apr. 9, 2019, U.S. Appl. No. 16/379,789.

Restriction Requirement dated Jan. 23, 2019, U.S. Appl. No. 15/944,512, filed Apr. 3, 2018.

FAIPP Office Action dated Nov. 13, 2019, U.S. Appl. No. 16/398,258, filed Apr. 29, 2019.

Restriction Requirement dated Nov. 15, 2019, U.S. Appl. No. 16/398,254, filed Apr. 29, 2018.

Notice of Allowance dated Jan. 10, 2020, U.S. Appl. No. 16/398,254, filed Apr. 29, 2018.

Notice of Allowance dated Oct. 2, 2019, U.S. Appl. No. 16/379,784, filed Apr. 9, 2019.

Notice of Allowance dated Jan. 17, 2020, U.S. Appl. No. 16/379,786, filed Apr. 9, 2019.

Notice of Allowance dated Feb. 18, 2020, U.S. Appl. No. 16/379,798, filed Apr. 9, 2019.

Burcham, Robert H., et al., "Pre-processing of Mobile Communications Device Geolocations According to Travel Mode in Traffice Analysis," filed Dec. 13, 2019, U.S. Appl. No. 16/714,277.

(56) References Cited

OTHER PUBLICATIONS

Notice of Allowance dated Mar. 12, 2020, U.S. Appl. No. 16/398,258, filed Apr. 29, 2019.
FAIPP Pre-Interview Communication dated Feb. 3, 2021, U.S. Appl. No. 16/379,781, filed Apr. 9, 2019.
Notice of Allowance dated Mar. 31, 2021, U.S. Appl. No. 16/379,781, filed Apr. 9, 2019.
Notice of Allowance dated Mar. 16, 2020, U.S. Appl. No. 16/714,277, filed Dec. 13, 2019.
Notice of Allowance dated Sep. 28, 2020, U.S. Appl. No. 16/860,719, filed Apr. 28, 2020.
FAIPP Pre-Interview Communication dated Jun. 14, 2021, U.S. Appl. No. 16/379,774, filed Apr. 28, 2020.
FAIPP Office Action dated Aug. 11, 2021, U.S. Appl. No. 16/379,774, filed Apr. 28, 2020.
Notice of Allowance dated Sep. 17, 2021, U.S. Appl. No. 16/379,774, filed Apr. 9, 2019.

* cited by examiner

ADAPTING CONTENT PRESENTATION BASED ON MOBILE VIEWSHEDS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A viewshed may be considered to be the area that is visible from a given location. The concept can have application in the reciprocal sense: the viewshed of an object may be considered to be that area from which the subject object—such as a scenic roadside view, a point of historical interest marker, or a billboard—can be adequately seen or observed.

SUMMARY

In an embodiment, a method of managing use of a digital billboard is disclosed. The method comprises determining, by an analysis application executing on a computer system, a plurality of mobile viewsheds for each of a plurality of mobile communication devices, where a mobile viewshed comprises a location, a speed, a direction of travel of the mobile communication device, a date, and a time and, for each of the plurality of mobile communication devices, accessing demographic information and profile information of a wireless communication service subscriber associated with the mobile communication device by the analysis application. The method further comprises determining which of the mobile viewsheds intersect a static viewshed of the digital billboard by the analysis application, where the static viewshed of the digital billboard is defined as an orientation and a delimited spatial area proximate to the digital billboard from which the billboard is deemed visible and, for each of the mobile viewsheds that intersect the static viewshed of the digital billboard, determining by the analysis application an arcscore weighted by the speed of the mobile viewshed and the angular alignment of the direction of travel of the mobile viewshed with the orientation of the static viewshed of the digital billboard. The method further comprises determining an average current traffic speed of vehicles traveling in a designated direction through the viewshed of the digital billboard, based on the arcscores and based on the average traffic speed, determining a rate of content rotation for the digital billboard, and replacing content presented on the digital billboard at the rate of content rotation.

In another embodiment, a method of constructing a digital billboard is disclosed. The method comprises determining, by an analysis application executing on a computer system, a plurality of mobile viewsheds for each of a plurality of mobile communication devices, where a mobile viewshed comprises a location, a speed, a direction of travel of the mobile communication device, a date, and a time and, for each of the plurality of mobile communication devices, accessing demographic information and profile information of a wireless communication service subscriber associated with the mobile communication device by the analysis application. The method further comprises identifying a plurality of candidate static viewsheds of a digital billboard to be constructed, where each candidate static viewshed of the digital billboard is defined as an orientation and a delimited spatial area proximate to the digital billboard from which the billboard is deemed visible, determining which of the mobile viewsheds intersect the candidate static viewsheds of the digital billboard by the analysis application, and, for each of the mobile viewsheds that intersect the static viewshed of the digital billboard, determining by the analysis application an arcscore weighted by the speed of the mobile viewshed and the angular alignment of the direction of travel of the mobile viewshed with the orientation of the static viewshed of the digital billboard. The method further comprises adapting each arcscore based on demographic information and profile information associated with the subscriber associated with the arcscore and based on a predefined demographic and profile weighting model, for each candidate static viewshed, summing the adapted arcscores associated with that static viewshed to determine an aggregate arcscore associated with the static viewshed, selecting one of the candidate static viewsheds based on the aggregate arcscores of the candidate static viewsheds, and constructing the digital billboard at the location of the selected static viewshed.

In yet another embodiment, a method of managing use of a digital billboard is disclosed. The method comprises determining, by an analysis application executing on a computer system, a plurality of mobile viewsheds for each of a plurality of mobile communication devices, where a mobile viewshed comprises a location, a speed, a direction of travel of the mobile communication device, a date, and a time and, for each of the plurality of mobile communication devices, accessing demographic information and profile information of a wireless communication service subscriber associated with the mobile communication device by the analysis application. The method further comprises determining which of the mobile viewsheds intersect a static viewshed of the digital billboard by the analysis application, where the static viewshed of the digital billboard is defined as an orientation and a delimited spatial area proximate to the digital billboard from which the billboard is deemed visible and, for each of the mobile viewsheds that intersect the static viewshed of the digital billboard, determining by the analysis application an arcscore based at least in part on the speed of the mobile viewshed and the angular alignment of the direction of travel of the mobile viewshed with the orientation of the static viewshed of the digital billboard. The method further comprises, based on the arcscores and based on the demographic and profile information associated with the subscriber associated with the arcscores, determining by the analysis application a valuation of presenting content on the digital billboard, providing the valuation of presenting content on the digital billboard to candidate content providers, receiving a bid from at least one of the candidate content providers, and presenting the content associated with a winning bid selected from the candidate content providers.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
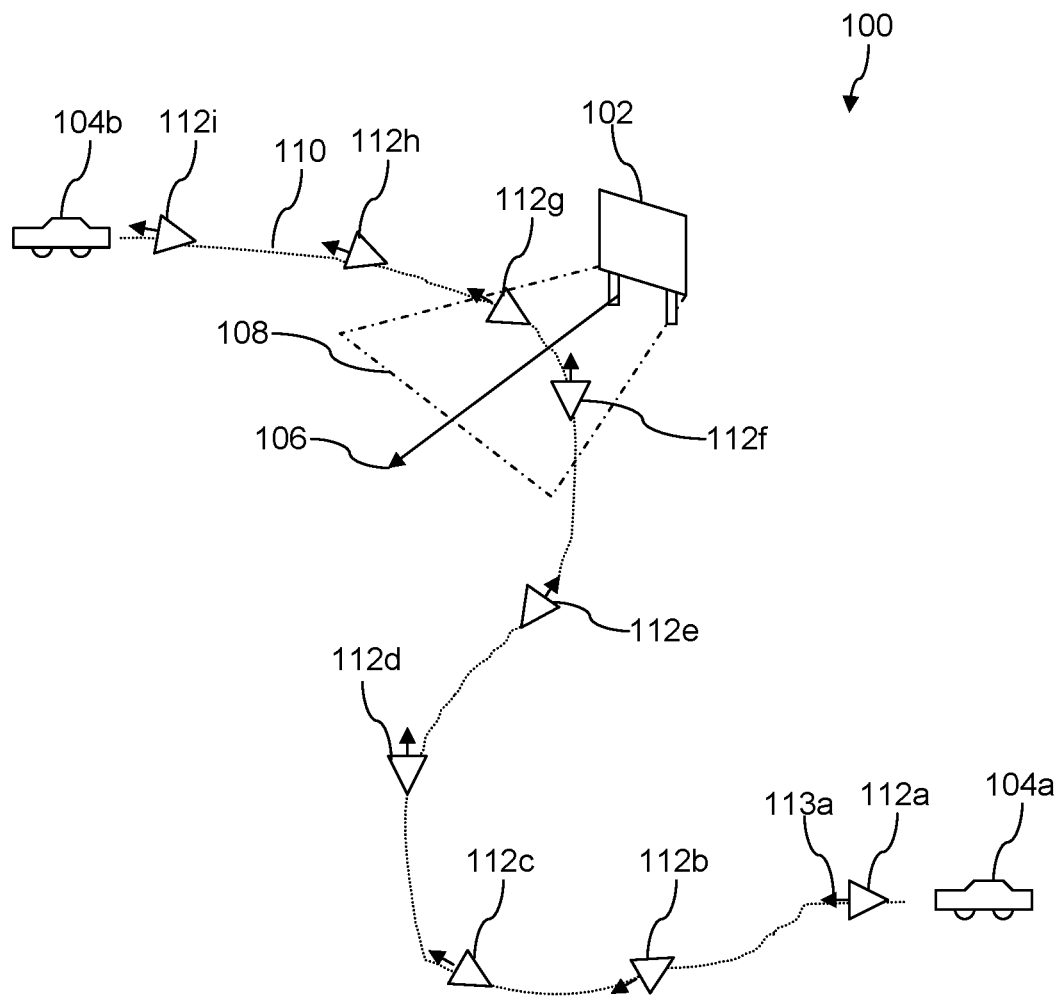
FIG. 1 is an illustration of a vehicle commuting path according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method that rationalizes analysis of out-of-home content presentation assets. For example, a system and method of evaluating and analyzing a digital billboard based on analysis of movement of mobile communication devices (e.g., cell phones associated with human beings driving vehicles on a roadway) based on location fixes of those devices and based on analysis of behavioral profiles and demographic information associated with those devices is taught herein. The orientation of the human beings with reference to the orientation of the presentation assets is taken into account by the analysis (a human being driving towards and hence facing towards a billboard is more affected by the billboard than a human being driving away from and facing away from the billboard) as is the speed of the devices. By linking this analysis to the specific behavior profiles and demographics of the wireless communication service subscribers associated with the mobile communication devices, the characterization and evaluation of the interaction between the mobile human being and the digital asset can be specialized to targeted presentation needs. This system is an information technology system based on computer system processing of large stores of data collected by other computer systems. The evaluation information can be used to a variety of different purposes, such as choosing where to locate an out-of-home content presentation asset, conducting an auction of the right to present content on the content presentation asset (e.g., a digital presentation asset that can change the content it presents quickly and via remote communication), and coordinating presentation of content among a plurality of proximally located content presentation assets.

A viewshed may be defined for an out-of-home content presentation asset, for example a digital billboard. While many of the examples discussed herein will refer to such a digital billboard, the teachings of the disclosure may be advantageously utilized for other out-of-home content presentation assets that are not digital billboards. The viewshed comprises a definition of a geographical area from which content presented on the asset is deemed to be visible to human viewers and a definition of an orientation of the asset. The geographical area may define a polygonal area, for example a trapezoidal area, where the trapezoid opens out or is wider on the parallel side away from the asset and the narrower parallel side abuts the asset. The viewshed defines a location of the asset (in an embodiment, the location may be integral with the definition of the polygonal area, but alternatively the location may be specified independently of the area of the viewshed). The direction of the asset may be defined as a ray directed out of one side of the plane of the asset (the side on which the content is presented). This direction may be normal or perpendicular to the plane of the asset, or it may be displaced angularly somewhat from the perpendicular to the plane of the asset. The viewshed of the out-of-home content presentation asset may be defined by an owner and/or operator of the asset. This viewshed definition may be stored in an electronic file or other data structure. A viewshed of a stationary content presentation asset may be considered to be static and unchanging, with the exception that the polygonal area and/or the orientation of the viewshed may be amended occasionally by an owner of the viewshed to correct errors or refine initial understandings of the viewshed of that asset. Notwithstanding that the viewshed may change occasionally, the viewshed associated with the content presentation asset will be referred to as the static viewshed hereinafter.

A mobile viewshed may be defined based on a plurality of location fixes of a mobile communication device. The mobile communication device may be thought of as a proxy for the human being who owns the device and is a wireless communication service subscriber associated with the device. Said in other words, the location of the mobile communication device is assumed to be a proxy for the location of the subscriber/human being. The mobile communication device may be a cell phone, a smart phone, a personal digital assistant (PDA), a media player, a wearable computer, a headset computer, a laptop computer, a notebook computer, or a tablet computer. In an embodiment, the mobile communication device may be a telematics unit or head unit embedded in a motor vehicle.

The mobile viewshed, in a simple articulation, is a definition of a field of view attributed to a human being (i.e., the wireless communication service subscriber) at a point in time using that human being's mobile communication device as a proxy witness. Unlike the static viewshed associated with a content presentation asset described above, the mobile viewshed of a wireless service subscriber changes in time, for example as the subscriber commutes from home to work, commutes from work to home, drives from home to the grocery store, drives from home to a school program, etc. The mobile viewshed comprises a location, an orientation, a speed, a date, and a time. The mobile viewshed may further comprise behavior profile information and demographic information associated with the subscriber associated with the mobile communication device. Alternatively, in an embodiment, the mobile view shed may further comprise a reference to behavior profile information and demographic information of the subscriber, for example a key to an entry in a data store of behavior profile information and demographic information.

An analysis application executing on a computer system can analyze data generated by mobile communication devices to determine locations of the device (and hence the locations of the subscriber) at different points in time. By taking any two location data points that are adjacent to each other in the time sequence, a direction and a speed of the device can be determined which, together with the two location fixes, can be used to establish a mobile viewshed—for example having a location mid-way between the two locations, having a time mid-way in time between the two time stamps, and having a speed determined based on the time taken to cross the distance between the two locations. The analysis application can determine a whole sequence of mobile viewsheds for a single device and store them in a data store for later processing. The analysis application can perform this process for a large number of other mobile communication devices in about the same area, for example in the Kansas City metroplex area or more specifically in the Overland Park area. This processing can be repeated for each of a plurality of areas or regions to complete this analysis across an entire wireless network coverage, for example across the entire United States, partitioned by region.

The analysis application can analyze mobile viewsheds of a single subscriber that are proximate to a static viewshed to determine if the static viewshed and the mobile viewsheds intersect. An intersection of a mobile view shed with a static viewshed indicates that there is at least the possibility that the subscriber experienced or saw the content presented on the content presentation asset. Intersections of the static viewshed and the mobile viewsheds can be further analyzed to determine an arcscore. The arcscore represents, in a simple articulation, the intensity of the experience a subscriber is deemed to have of a content presentation asset. It is assumed that the slower the subscriber is moving, the more the orientation of the subscriber's mobile viewshed aligns with the static viewshed, the more intense the experience has of the content presented by the asset. In an embodiment, other factors, too, can be brought into consideration in determining the arcscore, for example traffic density (at equal speeds, the user may be less aware of the content presented on the asset when driving in heavy traffic and more aware of the content presented on the asset when driving in light traffic), precipitation, and lighting conditions. The arcscores of a plurality of different subscribers but associated with the same content presentation asset may be analyzed to evaluate the aggregate value of content presented on the asset or to evaluate the aggregate experience of the content.

The processing by the analysis application may be performed in a batch mode long after the subscribers have left the static viewshed of a content presentation asset. The arcscores can be aggregated over a day, over a week, over a month, and the aggregate set of arcscores analyzed in various ways. For example arscores associated with specifically defined kinds of subscribers can be selected and processed. For example, a content provider may wish to select only the arcscores associated with females with an income in the range $45,000 to $75,000. This content provider may look at how a sum of those selected arcscores change over time of day to select a best time to present their advertisement directed to this targeted kind of subscribers. This content provider may be willing to bid a much higher price to present their content on the content presentation asset knowing, based on deterministic, quantitative analysis, how much attention his or her content will receive from the target audience.

The arcscores may be used to evaluate where to locate and construct a new content presentation asset, for example by performing arcscore analysis based on candidate static viewsheds where the new asset might be located. The arcscores may be used to determine a rotation rate of content on the asset—how long content is presented before it is swapped with different content. The arcscores may be used to coordinate presentation of content on a series of adjacent content presentation assets.

The present disclosure further teaches a system and method of valuing a digital billboard based on analysis of movement of mobile communication devices (e.g., cell phones associated with human beings driving vehicles on a roadway) based on location fixes of those devices and based on analysis of behavioral profiles and demographic information associated with those devices is taught herein. The orientation of the human beings with reference to the orientation of the presentation assets is taken into account by the analysis (a human being driving towards and hence facing towards a billboard is more affected by the billboard than a human being driving away from and facing away from the billboard) as is the speed of the devices. By linking this analysis to the specific behavior profiles and demographics of the wireless communication service subscribers associated with the mobile communication devices, the valuation of the digital asset can be specialized to targeted presentation needs. This system is an information technology system based on computer system processing of large stores of data collected by other computer systems. The valuation information can be used to a variety of different purposes, such as choosing where to locate an out-of-home content presentation asset, conducting an auction of the right to present content on the content presentation asset (e.g., a digital presentation asset that can change the content it presents quickly and via remote communication), and coordinating presentation of content among a plurality of proximally located content presentation assets.

Turning now to FIG. 1, a driving environment 100 is described. In an embodiment a vehicle 104 traverses a path 110. The vehicle 104*a* represents the vehicle at the start of the path 110, and the vehicle 104*b* represents the vehicle at the end of the path 110. A mobile viewshed 112 is associated with the vehicle 104 (and with a mobile communication device of a subscriber inside of the vehicle 104). As the vehicle 104 traverses the path 110 a sequence of mobile viewsheds 112*a*, 112*b*, 112*c*, 112*d*, 112*e*, 112*f*, 112*g*, 112*h*, and 112*i* may be determined, for example by an analysis application executing on a computer system analyzing location data collected from mobile communication devices. Each mobile viewshed 112 is associated with a mobile orientation 113, for example a first mobile orientation 113*a* associated with a first mobile viewshed 112*a*. The mobile orientation 113 indicates the direction of travel of the vehicle 104 (and hence of the mobile communication device and of the subscriber inside the vehicle 104). As vehicle 104 traverses the path 110 it may pass through a static viewshed 108 of a content presentation asset 102, for example a digital billboard. The static viewshed 108 has a location, a polygonal area, and a static orientation 106. Those mobile viewsheds 112 that are determined to be located within the polygonal area of the static viewshed 108 may be analyzed to determine an intensity of experience of any content presented by the asset 102, for example an arcscore.

Figure 2:
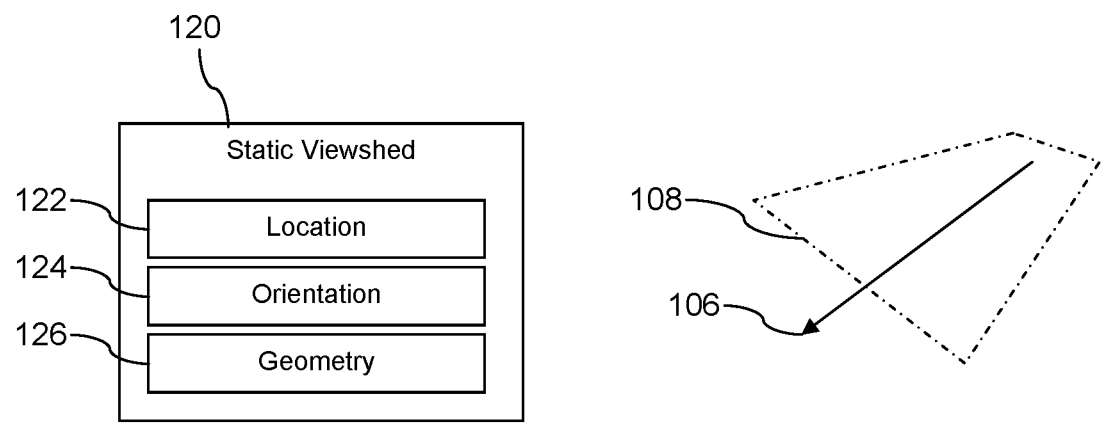
FIG. 2 is an illustration of a static viewshed according to an embodiment of the disclosure.

Turning now to FIG. 2, a static viewshed 120 is described. In an embodiment, the static viewshed 120 may be considered to be a composite data object that comprises a location 122, an orientation 124, and a geometry 126. In general, the data content of the static viewshed 120 reflects the information illustrated in FIG. 1 by the static viewshed polygon 108 and the static orientation 106. The values of the components of the static viewshed 120 may be defined in any way. In an embodiment, the location 122 and the geometry 126 may be combined, for example the definition of the geometry may imply the location 122. Alternatively, the location 122 may be defined separate from the geometry 126. The geometry 126 may define a perimeter, for example a polygonal perimeter. The orientation 124 may be defined relative to the geometry 126 or relative to a universal geographic reference system. In an embodiment, the orientation 124 and the geometry 126 may be based on a flat 2-dimensional world (e.g., vehicles 104 and assets 102 are contained within the same 2-dimensional plane). In another embodiment, however, the orientation 124 and the geometry 126 may be based on a 3-dimensional world. For example the static orientation 124 may be defined both in azimuth and in elevation (or equivalent rotational coordinate systems). For example, the geometry 126 may be expressed in a more complex way than simply a polygonal perimeter but may be defined to indicate occultations of the asset due to terrain at some points in the static viewshed.

Figure 3:
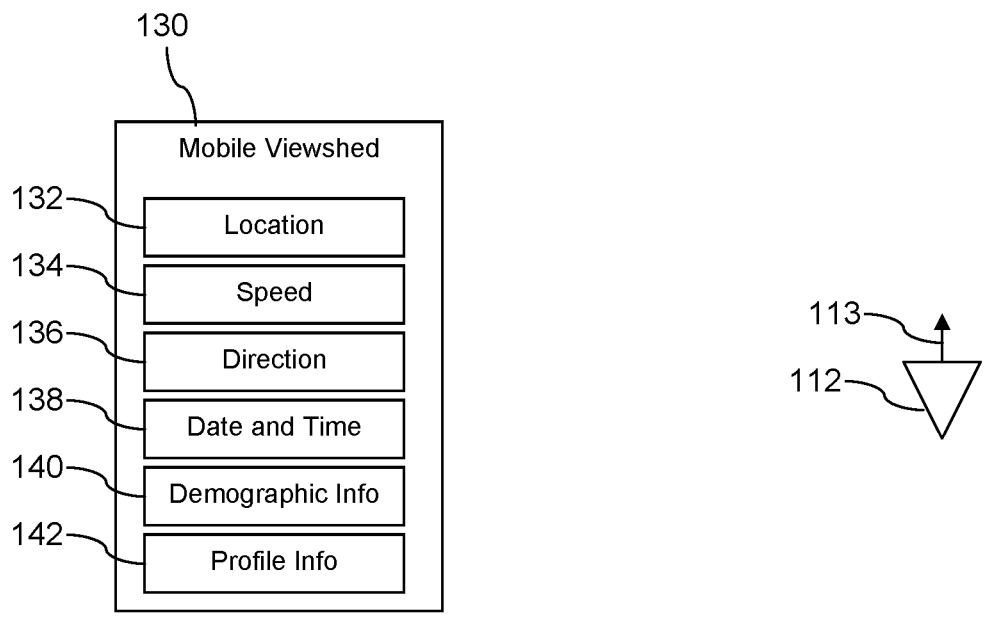
FIG. 3 is an illustration of a mobile viewshed according to an embodiment of the disclosure.

Turning now to FIG. 3, a mobile viewshed 130 is described. In an embodiment, the mobile viewshed 130 may be considered to be a composite data object that comprises a location 132, a speed 134, a direction 136, a date and time 138, demographic information 140, and behavior profile information 142. In an embodiment, rather than storing demographic information 140 and behavior profile information 142 in the mobile viewshed 130 (remembering that there may be a substantial number of separate mobile viewsheds 130 associated with a single wireless communication subscriber), the information 140, 142 may be replaced by a reference, address, or pointer to demographic information and behavior profile information associated with the subject subscriber in a data store. In an embodiment, the mobile viewshed 130 comprises an identity of the subscriber and/or the mobile communication device, and this identity may be used to access the associated demographic information and behavior profile information in the data store.

The location and speed of the mobile viewshed 130 may be determined from a pair of location fixes that are adjacent in time associated with the mobile communication device. The location may be deemed to be a mid-point location between the two location fixes and the speed may be determined from the distance between the two location fixes and a time that has passed between the two location fixes. The location fixes may be transmitted by the mobile communication device along with a time-date stamp. Alternatively, the time and date that the location fix is received by a mobile communication network may be used to time-date stamp the subject location fix. The direction 136 may be determined as the direction the mobile communication device is assumed to have traveled in going from the location prior in time to the next location adjacent in time. To a first order of approximation, the direction 136 would be determined as the directed line from a first location A to the second location B. In other approximations another method of determining the direction 136 may be employed, for example a method that takes into consideration a trend indicated over three or more sequential location fixes.

The demographic information 140 (either stored in the mobile viewshed 130 or stored in a data store referred to by a reference in the mobile viewshed 130) may comprise one or more of an age or age category, a gender, an income category or partition, an education level, a residence location (e.g., a zip-code, a town of residence, a county of residence, a state of residence, a postal address, or other location), a marital status, and a number of children. The behavior profile information 142 may comprise one or more of number of mobile applications installed on a mobile communication device, frequency of on-line purchasing, dollar amount of on-line purchasing per unit of time, frequency of dining out, travel pattern information, number of different phone numbers the device conducted voice calls with per unit of time, and the number of text messages processed by the device per unit of time. The demographic information 140 and the behavior profile information 142 may comprise other information items also.

Figure 4:
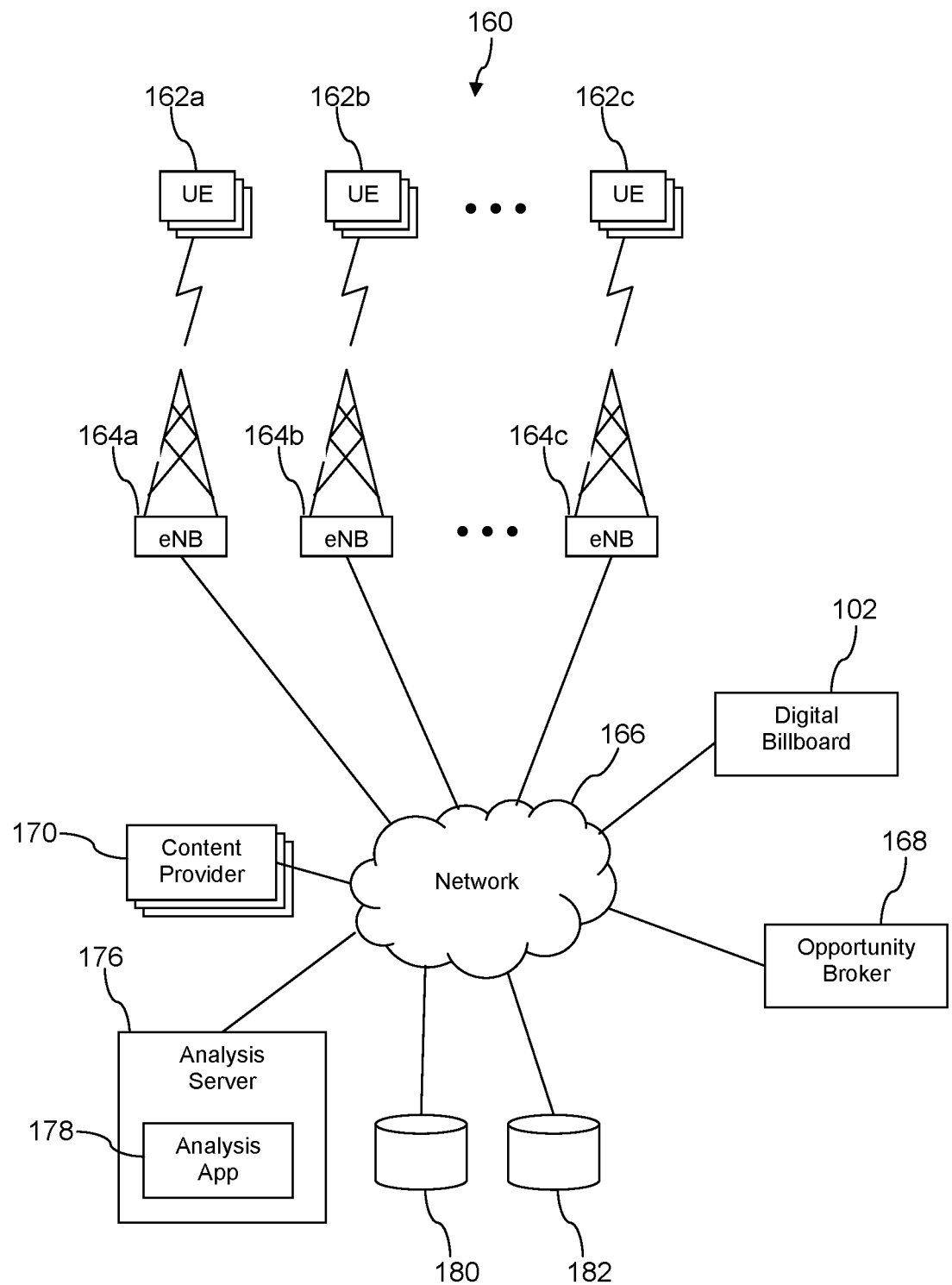
FIG. 4 is a block diagram of a communication system according to an embodiment of the disclosure.

Turning now to FIG. 4, a communication system 160 is described. In an embodiment, the system 160 comprises mobile communication devices (user equipments—UEs) 162, cell sites 164, and a network 166. For example, a first mobile communication device 162a may establish a wireless communication link with a first cell site 164a, a second mobile communication device 162b may establish a wireless communication link with a second cell site 164b, and a third mobile communication device 162c may establish a wireless communication link with a third cell site 164c. The cell sites 164 may provide wireless communication links according to a long term evolution (LTE), a code division multiple access (CDMA), a global system for mobile communications (GSM), a worldwide interoperability for microwave access (WiMAX), or other telecommunications wireless protocol. While three mobile communication devices 162 and three cell sites 164 are illustrated in FIG. 4, the system 160 may comprise tens of millions of mobile communications devices and tens of thousands of cell sites 164. The network 166 may be one or more private networks, one or more public networks, or a combination thereof.

The communication devices 162 may be employed by wireless communication service subscribers to complete voice calls, to send and receive text messages, to browse the Internet, and to execute mobile applications. In the course of normal operation these mobile communication devices 162 may self-determine their locations and transmit them to be stored in a device locations data store 180. The entries in the device locations data store 180 may be data objects that comprise an identity of the device 162 (or the identity of the wireless communication service subscriber that owns the device 162), a location, a date, and a time. The devices 162 may self-locate using a global positioning system (GPS) receiver to determine its GPS coordinates. Alternatively, the devices 162 may self-locate based on trilateration techniques. The communication devices 162 may change location over time because the subscriber is in a moving vehicle, driving or riding as a passenger, such as is illustrated in FIG. 1. As the devices 162 move, they may come within the static viewshed 120 of a content presentation asset 102, for example a digital billboard. The content presented by the asset 102 may be sourced by content providers 170 and selected for presentation and later replacement by an opportunity broker 168. The content may be advertisements and/or public service announcements.

An analysis computer system 176 may execute an analysis application 178 that accesses the device locations data store 180 and analyzes the data to determine a plurality of mobile viewsheds 130. The analysis application 178 may determine a large number of mobile viewsheds 130 for each of a large number of subscribers and/or mobile communication devices 162 based on the location data stored in the device locations data store 180. The analysis application 178 may store the mobile viewsheds 130 in a viewshed data store 182. The viewshed data store 182 may store a number of static viewsheds 120 associated with content presentation assets 102, for example digital billboards. In an embodiment, the viewshed data store 182 may store billions of mobile viewsheds 130 and tens of thousands or hundreds of thousands of static viewsheds 120.

The analysis application 178 may analyze mobile viewsheds 130 to determine which of them intersect with or pass through a static viewshed 120 selected for analysis. The analysis application 178 may partition the set of all mobile viewsheds 130 stored in the viewshed data store 182 in some way to avoid having to examine each of more than a billion viewsheds. For example each of the mobile viewsheds 130 may be associated with a geographical tile, where each tile may be a delimited area of 5 miles by 5 miles, 10 miles by 10 miles, or some other area. When accessing mobile viewsheds 130 from the viewsheds data store 182, the analysis application 178 may only access those from the same tile that the content presentation asset 102 is located in.

The analysis application 178 may further analyze the mobile viewsheds 130 that are deemed to intersect with the static viewshed 120 of interest to determine an arcscore for each of these intersecting mobile viewsheds 130. The arcscore may be determined as a number that is constrained to a particular range, for example from 0 to 1, from 0 to 10, from 0 to 100, or some other constrained numeric range. The arcscore may depend, at least in part, on an alignment of the orientation 124 of the static viewshed with the direction 136 of the mobile viewshed 130. The maximum alignment may occur when the orientation 124 is pointed directly at the direction 136. Said in another way, the maximum alignment may occur when the orientation 124 is 180 degrees offset from the direction 136 (e.g., if the orientation 124 is directed at a 180 degree angle relative to a given angular reference while the direction 136 is directed at a 0 degree angle relative to the same given angular reference). The minimum alignment may occur when the orientation 124 is pointed to the same bearing as the direction 136 (e.g., both the orientation 124 and the direction 136 are directed at 180 degree angle relative to a given angular reference). Alternatively, the minimum alignment may occur when the orientation 124 is pointed less than ±60 degrees away from the direction 136, less than ±90 degrees away from the direction 136, less than ±120 degrees away from the direction 136, or some other predefined threshold.

The arcscore may depend, at least in part, on the speed 134 of the mobile viewshed 130. The arcscore may depend, at least in part, on other factors related to visibility such as precipitation and daylight. In an embodiment, an arcscore may be determined as:

$$\text{arcscore} = \Pi_1{}^n f_i \qquad \text{EQ 1}$$

where f is one of a plurality of n factors in a product that determines the arcscore. Each factor f may be constrained within a range of minimum and maximum values. As an example, in an embodiment, $f_1$ is an angle factor that is restricted to the range 0.3 to 1.0, $f_2$ is a speed factor that is restricted to the range 0.3 to 1.0. If the orientation 124 of the static viewshed 120 and the direction 136 of the mobile viewshed 130 are optimally aligned, the angle factor is 1 while if the orientation 124 of the static viewshed 120 and the direction 136 of the mobile viewshed 130 are poorly aligned, the angle factor is 0.3. If the speed 134 of the mobile viewshed 130 is less than a first predefined speed (e.g., less than 35 miles per hour) the speed factor is 1.0; if the speed is greater than a second predefined speed (e.g., more than 70 miles per hour) the speed factor is 0.3; and intermediate speeds between these values correspond to intermediate speed factors. Given these example values, if a mobile viewshed 130 (e.g., a subscriber in a vehicle 104) is traveling at 30 miles per hour within the geometry 126 of the static viewshed 120 and the orientation 124 of the static viewshed 120 is optimally aligned with the direction 136 of the mobile viewshed 130, the arcscore is 1.0—a maximum value corresponding to the most intense subscriber experience of content presented on the content presentation asset 102.

As another example, if a mobile viewshed 130 is traveling at 53 miles per hour within the geometry 126 of the static viewshed 120 and the orientation 124 of the static viewshed 120 is intermediately aligned with the direction 136 of the mobile viewshed 130, $f_1$ may be determined to be about 0.65, $f_2$ may be determined to be about 0.65, and the arcscore may be determined to be about 0.42. As yet another example, if a mobile viewshed 130 is traveling at 72 miles per hour within the geometry 126 of the static viewshed 120 and the orientation 124 of the static viewshed 120 is poorly aligned with the direction 136 of the mobile viewshed 130, $f_1$ may be determined to be about 0.3, $f_2$ may be determined to be about 0.3, and the arcscore may be determined to be about 0.1. These simple examples provide some illustration of how the factors that contribute to the intensity of a subscriber's experience of content presented on the content presentation asset 102 may be used to determine an arcscore. It is understood that any number of factors may be used and different constrained factor values may be applied in other embodiments. The arcscores can be used to a variety of purposes.

Arcscores can be calculated to evaluate where to locate and construct a new content presentation asset. Several candidate locations for a new content presentation asset may be identified and static viewsheds defined for them. The arcscores can then be calculated from these static viewsheds and the mobile viewsheds. The best arcscore total can be used to choose the spot to build the new content presentation asset. Alternatively, if the best arcscore total does not satisfy a minimum total, the idea of building the new content presentation asset may be discarded. Alternatively, a different set of candidate locations may be defined and analyzed in the same way. In some circumstances, evaluation of where to locate and construct a new content presentation asset may modify historic mobile view shed data in various ways when using them to calculate a total arcscore for a candidate new content presentation asset location. For example, future growth may be assumed for the candidate areas and mobile view shed counts may be increased proportionally. For example, arcscore valuation based on vehicle speeds may be decreased based on projecting greater traffic congestion in the future. Thus, this method of evaluating candidate locations for new content presentation assets can be performed based on projections of future conditions.

Arcscores can be used to evaluate a rotation rate of content on the asset—how long content is presented before it is swapped with different content. For example, if vehicles are moving fast, content may be presented longer, because any mobile viewer is only seeing the content for a limited period of time—the duration during which the content presentation asset is in view. By contrast, when vehicles are moving slow or are in stop-and-go traffic conditions, the content may be changed more frequently, on the consideration that the same mobile viewers will begin to disregard the content after it has been in view for ten seconds, for one minute, for two minutes. If the mobile viewer is moving quickly, and they only see the content for five seconds, it does not matter to them if the content is persistently presented for twenty minutes.

Arcscores can also be used to coordinate content on a series of adjacent content presentation assets. For example, a given content may be presented on a first digital content presentation asset and then presented on a second digital content presentation asset at a later time that aligns with an average traffic speed offset from the first asset, whereby a same mobile person may see the same content on two successive digital content presentation assets to better establish the message of the presentation content in his or her mind. For example, if the mobile person does not see the content for a sufficient duration of time on the first asset, the combination of seeing the same content on the first asset and then again on the second asset may be determinative for promoting the content sinking into his or her mind.

Figure 5A:
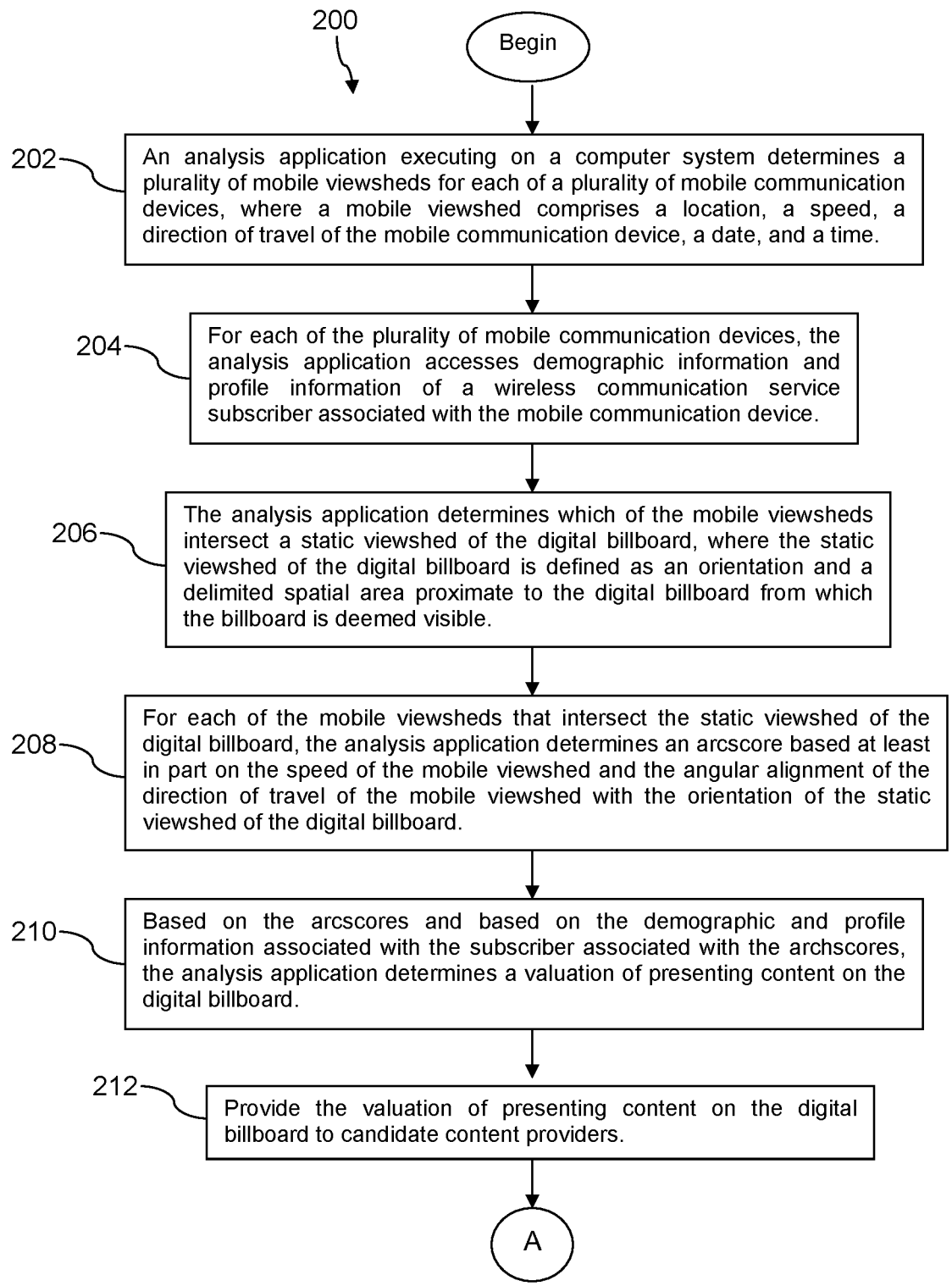
FIG. 5A and FIG. 5B is a flow chart of a method according to an embodiment of the disclosure.
Figure 5B:
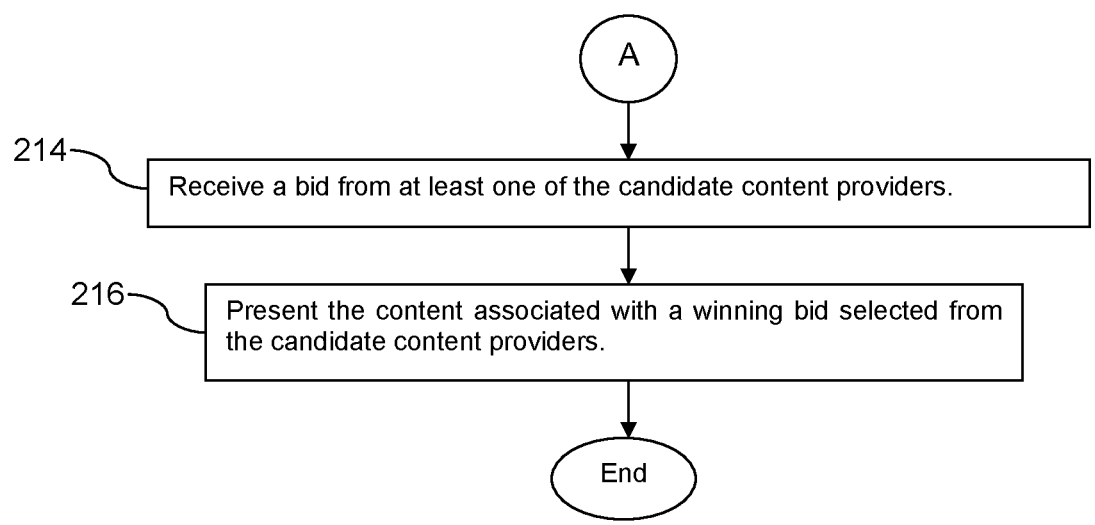

Turning now to FIG. 5A and FIG. 5B, a method 200 is described. At block 202, an analysis application executing on a computer system determines a plurality of mobile viewsheds for each of a plurality of mobile communication devices, where a mobile viewshed comprises a location, a speed, a direction of travel of the mobile communication device, a date, and a time. At block 204, for each of the plurality of mobile communication devices, the analysis application accesses demographic information and profile information of a wireless communication service subscriber associated with the mobile communication device. At block 206, the analysis application determines which of the mobile viewsheds intersect a static viewshed of the digital billboard, where the static viewshed of the digital billboard is defined as an orientation and a delimited spatial area proximate to the digital billboard from which the billboard is deemed visible. At block 208, for each of the mobile viewsheds that intersect the static viewshed of the digital billboard, the analysis application determines an arcscore based at least in part on the speed of the mobile viewshed and the angular alignment of the direction of travel of the mobile viewshed with the orientation of the static viewshed of the digital billboard.

At block 210, based on the arcscores and based on the demographic and profile information associated with the subscriber associated with the arcscores, the analysis application determines a valuation of presenting content on the digital billboard. The valuation may be determined based on evaluating the demographic and profile information based on a weighting of the demographic and/or profile information values defined by a candidate content provider. For example, a first candidate content provider may weight a gender value of 'female' and an income value of $45,000 to $75,000 to provide a maximum valuation because that candidate content provider is interested in marketing a product directed to women with medium to high income. The weighting may be provided in the form or a defined filter or rule. The weighting may be provided as a set of coefficients for each factor, where the different values of coefficients are associated with different values and/or ranges of values of the associated factor. Because different candidate content providers may define different weightings, filters, and/or rules for evaluating demographic and profile information, the analysis application may determine different evaluation scores for different candidate content providers.

Figure 6:
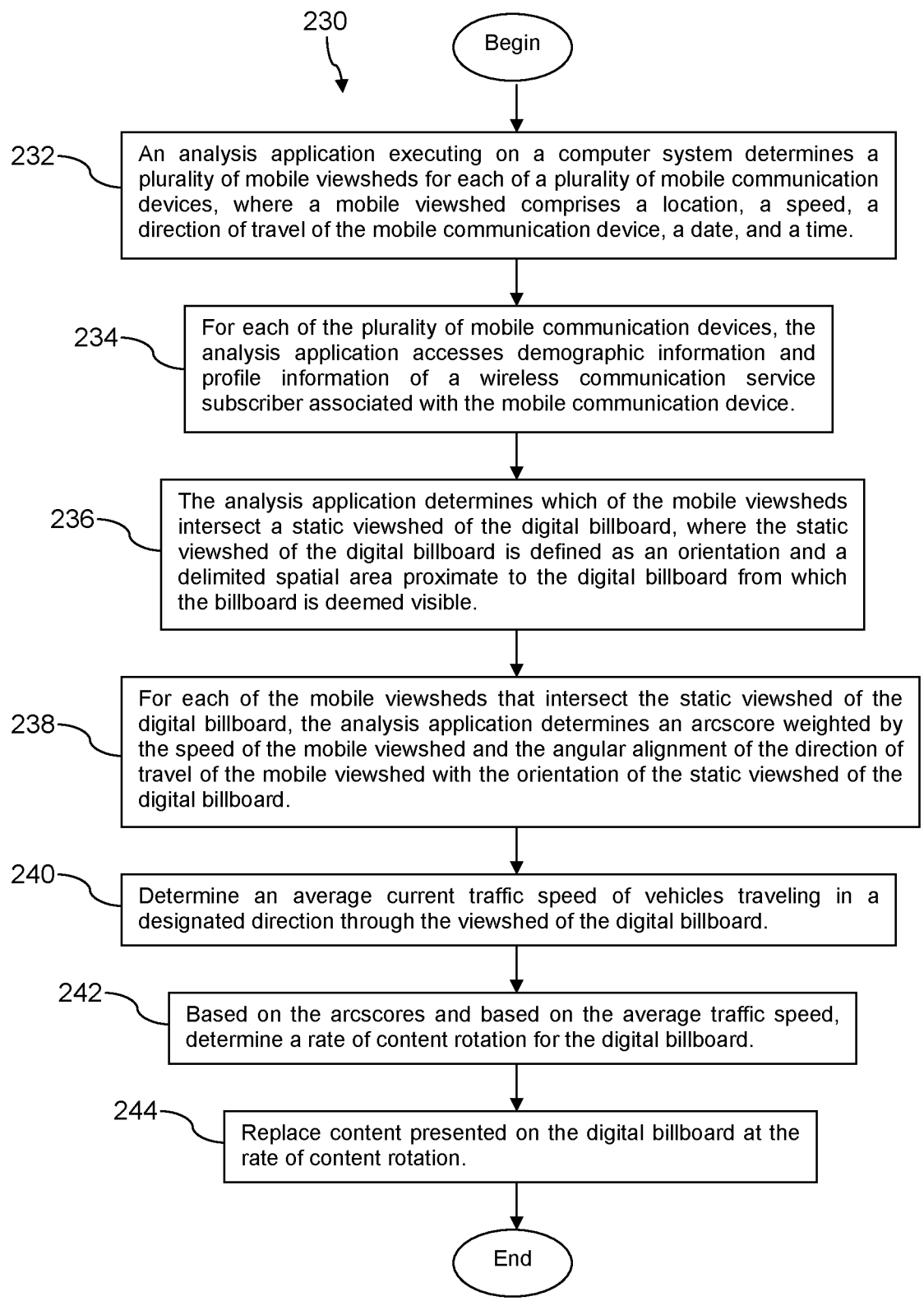
FIG. 6 is a flow chart of a method according to an embodiment of the disclosure.

At block 212, providing the valuation of presenting content on the digital billboard to candidate content providers. At block 214, receive a bid from at least one of the candidate content providers. At block 216, present the content associated with a winning bid selected from the candidate content providers Turning now to FIG. 6, a method 230 is described. At block 232, an analysis application executing on a computer system determines a plurality of mobile viewsheds for each of a plurality of mobile communication devices, where a mobile viewshed comprises a location, a speed, a direction of travel of the mobile communication device, a date, and a time. At block 234, for each of the plurality of mobile communication devices, the analysis application accesses demographic information and profile information of a wireless communication service subscriber associated with the mobile communication device. At block 236, the analysis application determines which of the mobile viewsheds intersect a static viewshed of the digital billboard, where the static viewshed of the digital billboard is defined as an orientation and a delimited spatial area proximate to the digital billboard from which the billboard is deemed visible.

At block 238, for each of the mobile viewsheds that intersect the static viewshed of the digital billboard, the analysis application determines an arcscore weighted by the speed of the mobile viewshed and the angular alignment of the direction of travel of the mobile viewshed with the orientation of the static viewshed of the digital billboard. At block 240, determine an average current traffic speed of vehicles traveling in a designated direction through the viewshed of the digital billboard. The average traffic speed may be determined based on a radar sampling of traffic speeds. For example, it may be assumed that generally motor vehicles driving in the same direction at about the same road location at the same time of day are moving at about the same speed. Several speed data points may be collected by a radar gun device, the determined speeds averaged, and this average speed used for further analysis in method 230. Alternatively, the average traffic speed may be determined based on selecting several mobile viewsheds associated with the current time of day (but form a different date), average the speeds stored in those selected mobile viewsheds, and use this average speed for further analysis in method 230, on the assumption that at about the same time of day, traffic speed at the location would be generally similar. At block 242, based on the arcscores and based on the average traffic speed, determine a rate of content rotation for the digital billboard. At block 244, replace content presented on the digital billboard at the rate of content rotation.

Figure 7A:
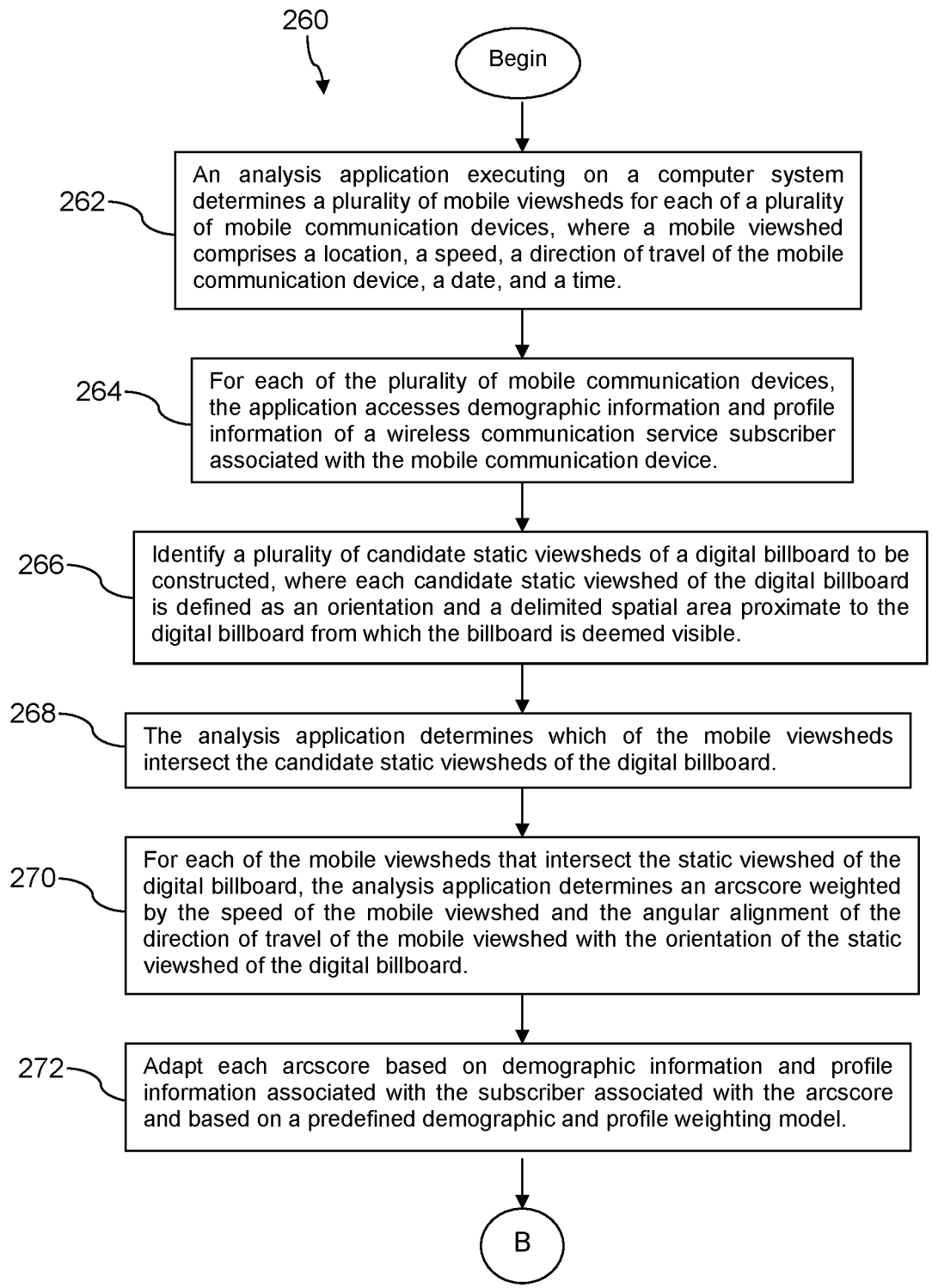
FIG. 7A and FIG. 7B is a flow chart of a method according to an embodiment of the disclosure.
Figure 7B:
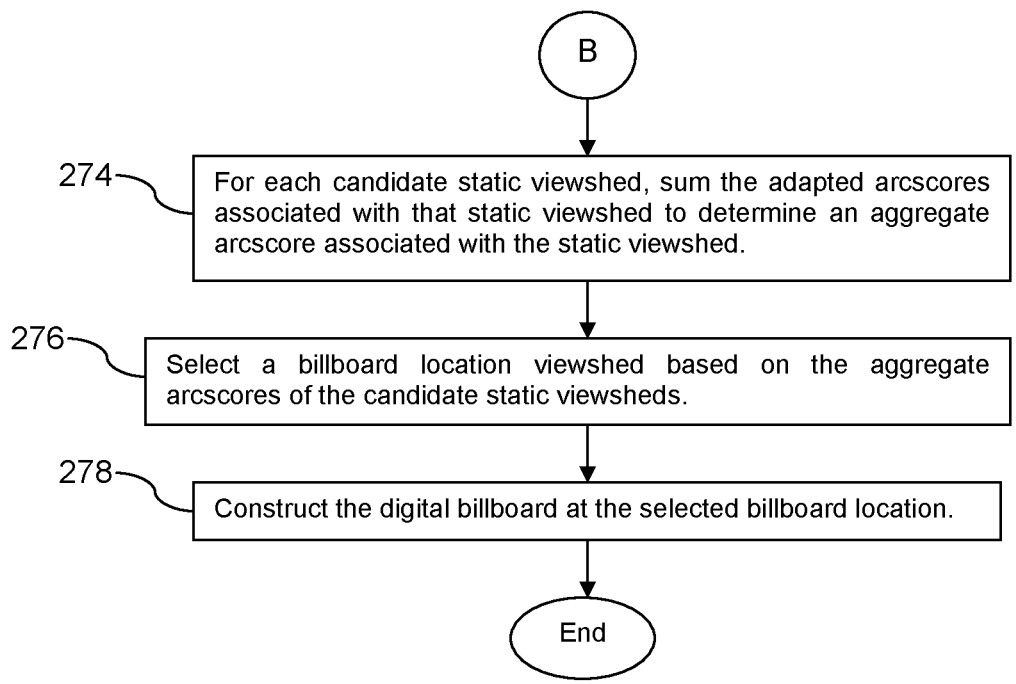

Turning now to FIG. 7A and FIG. 7B, a method 260 is described. At block 262, an analysis application executing on a computer system determines a plurality of mobile viewsheds for each of a plurality of mobile communication devices, where a mobile viewshed comprises a location, a speed, a direction of travel of the mobile communication device, a date, and a time. The processing of block 262 may comprise accessing location fix data from the device locations data store 180. The processing of block 262 may further comprise storing the mobile viewsheds in the viewsheds data store 182. At block 264, for each of the plurality of mobile communication devices, the application accesses demographic information and profile information of a wireless communication service subscriber associated with the mobile communication device. At block 266, identify a plurality of candidate static viewsheds of a digital billboard to be constructed, where each candidate static viewshed of the digital billboard is defined as an orientation and a delimited spatial area proximate to the digital billboard from which the billboard is deemed visible.

At block 268, the analysis application determines which of the mobile viewsheds intersect the candidate static viewsheds of the digital billboard. In an embodiment, the analysis application restricts the mobile viewsheds that it accesses from the viewsheds data store 182 to those mobile viewsheds with a date over at least 30 days. In an embodiment, the analysis application restricts the mobile viewsheds that it accesses from the viewsheds data store 182 to viewsheds with locations from a region containing the candidate static viewsheds. In an embodiment, this region may be predefined and provided to the analysis application. The region may be defined as an area of interest in which consideration for constructing a content presentation asset 102 is being given, for example along a 8 mile length of highway in suburban area. The region may be less than 60 square miles, less than 40 square miles, less than 20 square miles, less than 5 square miles, or some other restricted area. At block 270, for each of the mobile viewsheds that intersect the static viewshed of the digital billboard, the analysis application determines an arcscore weighted by the speed of the mobile viewshed and the angular alignment of the direction of travel of the mobile viewshed with the orientation of the static viewshed of the digital billboard. At block 272, adapt each arcscore based on demographic information and profile information associated with the subscriber associated with the arcscore and based on a predefined demographic and profile weighting model.

At block 274, for each candidate static viewshed, sum the adapted arcscores associated with that static viewshed to determine an aggregate arcscore associated with the static viewshed. At block 276, select a billboard location viewshed based on the aggregate arcscores of the candidate static viewsheds. For example, the location associated with the highest aggregate arcscore may be selected. At block 278, construct the digital billboard at the selected billboard location.

Figure 8:
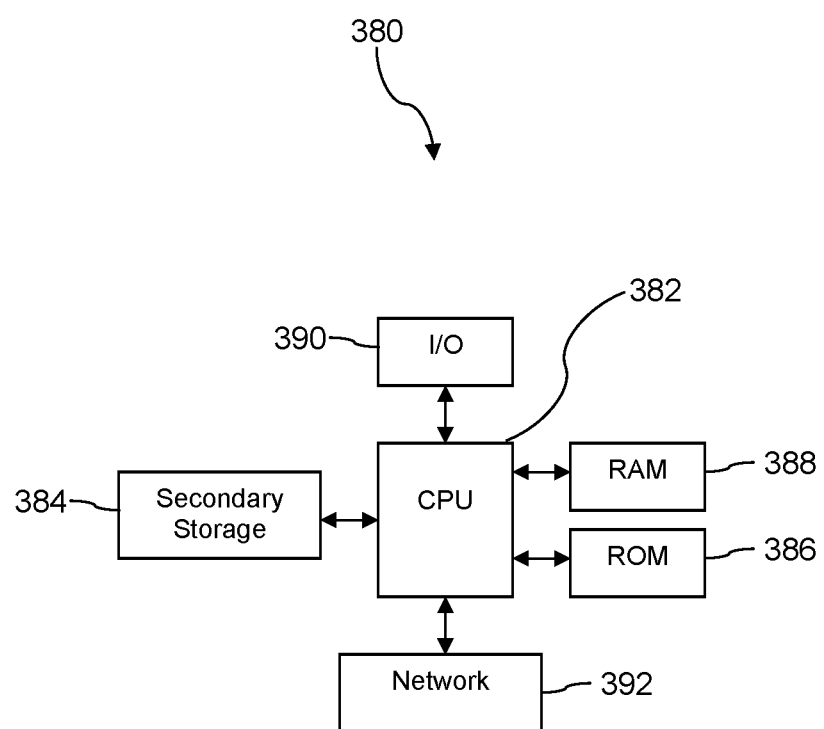
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing use of a digital billboard, comprising:

determining, by an analysis application executing on a computer system, a plurality of mobile viewsheds for each of a plurality of mobile communication devices, where a mobile viewshed comprises a location, a speed, a direction of travel of the mobile communication device, a date, and a time;

for each of the plurality of mobile communication devices, accessing demographic information and profile information of a wireless communication service subscriber associated with the mobile communication device by the analysis application;

partitioning the plurality of mobile viewsheds into a plurality of geographical tiles based on the location associated with each of the plurality of mobile viewsheds by the analysis application, wherein each geographic tile of the plurality of geographic tiles represents a delimited area and comprises one or more mobile viewsheds of the plurality of mobile viewsheds with a corresponding location within the delimited area;

accessing and analyzing, by the analysis application, mobile viewsheds from a geographic tile of the plurality of geographic tiles that a static viewshed of the digital billboard is located in instead of accessing and analyzing all of the plurality of mobile viewsheds;

determining which of the mobile viewsheds from the geographic tile intersect the static viewshed of the digital billboard by the analysis application, where the static viewshed of the digital billboard is defined as an orientation and a delimited spatial area proximate to the digital billboard from which the billboard is deemed visible;

for each of the mobile viewsheds from the geographic tile that intersect the static viewshed of the digital billboard, determining, by the analysis application, an arcscore weighted by the speed of the mobile viewshed and the angular alignment of the direction of travel of the mobile viewshed with the orientation of the static viewshed of the digital billboard, wherein the arcscore represents an intensity of an experience a subscriber associated with the mobile viewshed and a corresponding mobile communication device is deemed to have of the digital billboard;

aggregating, by the analysis application, the arcscores of a plurality of different subscribers with the mobile viewsheds that intersect the static viewshed of the digital billboard over a period of time;

determining an average current traffic speed of vehicles traveling in a designated direction through the static viewshed of the digital billboard;

based on the aggregated arcscores and based on the average traffic speed, determining a rate of content rotation for the digital billboard; and replacing content presented on the digital billboard at the determined rate of content rotation.

2. The method of claim 1, wherein the average traffic speed is determined based on a radar sampling of traffic speeds.

3. The method of claim 1, wherein the average traffic speed is determined based on a current time of day and a speed of a plurality of mobile viewsheds that intersect the static viewshed during that current time of day.

4. The method of claim 1, wherein the mobile communication devices comprise a cell phone, a smart phone, a personal digital assistant (PDA), a media player, a wearable computer, a headset computer, a laptop computer, a notebook computer, or a tablet computer.

5. The method of claim 1, wherein the demographic information comprises at least two of an age category, a gender, an income category, an education level, a residence location, a marital status, and a number of children.

6. The method of claim 1, wherein the profile information comprises at least two of a number of mobile applications installed on a mobile communication device, a frequency of on-line purchasing, a dollar amount of on-line purchasing per unit of time, a frequency of dining out, a travel pattern, or a number of text messages processed per unit of time.

7. The method of claim 1, wherein the delimited spatial area of the static viewshed defines a polygonal perimeter.

8. The method of claim 1, wherein the plurality of mobile viewsheds are based on location fixes of mobile communication devices collected over a period of time.

9. The method of claim 1, wherein determining the plurality of mobile viewsheds comprises accessing location fix data from the plurality of mobile communication devices by the analysis application from a data store and analyzing the data to determine speed and direction of travel.

10. The method of claim 1, wherein the analysis application determines which of the mobile viewsheds intersect the static viewshed of the digital billboard and determines the arcscores after corresponding subscribers have left the static viewshed.

11. The method of claim 1, further comprising:

based on the arcscores and based on the demographic and profile information associated with each subscriber associated with the arcscores, determining by the analysis application a valuation of presenting content on the digital billboard;

providing the valuation of presenting content on the digital billboard to candidate content providers;

receiving a bid from at least one of the candidate content providers; and presenting the content associated with a winning bid selected from the candidate content providers.

12. The method of claim 11, wherein the analysis application determines the arcscore further based on a traffic density in the vicinity of the static viewshed and at the time and date of the associated mobile viewshed.

13. The method of claim 11, wherein the analysis application determines the arcscore further based on a precipitation condition in the vicinity of the static viewshed and at the time and date of the associated mobile viewshed.

14. The method of claim 11, wherein the analysis application determines the arcscore further based on a lighting condition at the time and date of the associated mobile viewshed.

15. The method of claim 11, wherein the valuation determined by the analysis application is further based on evaluating demographic and profile information according to a factor weighting defined by a candidate content provider.

16. The method of claim 15, wherein different candidate content providers define their own factor weighting and wherein the valuation provided to each different candidate content provider is the valuation made based on its own factor weighting.

17. The method of claim 11, wherein the mobile communication devices comprise a cell phone, a smart phone, a personal digital assistant (PDA), a media player, a wearable computer, a headset computer, a laptop computer, a notebook computer, or a tablet computer.

18. The method of claim 11, wherein the plurality of mobile viewsheds are based on location fixes of mobile communication devices collected over a period of time.

19. The method of claim 11, wherein determining the plurality of mobile viewsheds comprises accessing location fix data from the plurality of mobile communication devices by the analysis application from a data store and analyzing the data to determine speed and direction of travel.

20. The method of claim 11, wherein the analysis application determines which of the mobile viewsheds intersect the static viewshed of the digital billboard and determines the arscores after corresponding subscribers have left the static viewshed.

* * * * *